United States Patent [19]
Gara

[11] Patent Number: 5,237,483
[45] Date of Patent: Aug. 17, 1993

[54] PROTECTOR SYSTEM FOR LOW VOLTAGE POWER FEED

[75] Inventor: Allen D. Gara, Chicago, Ill.

[73] Assignee: Reliance Comm/Tec Corporation, Chicago, Ill.

[21] Appl. No.: 769,460

[22] Filed: Oct. 1, 1991

[51] Int. Cl.$^5$ .......................... H02H 9/02; H01C 7/12
[52] U.S. Cl. ...................................... 361/119; 361/126
[58] Field of Search ............... 361/126, 118, 117, 119; 359/110, 152

[56] References Cited

U.S. PATENT DOCUMENTS 4,306,313  12/1981  Baldwin .............................. 359/110
4,876,621  10/1989  Rust et al. ............................. 361/119

OTHER PUBLICATIONS

"Sneak Fuse Module Layout," 2 Pages of drawings, Reliance Comm/Tec, Jan. 11, 1989.
"Reliance Comm/Tec Catalog" Section 1, pp. 61–64; 1991.

Primary Examiner—Todd E. De Boer
Assistant Examiner—Ronald W. Leja
Attorney, Agent, or Firm—Trexler, Bushnell, Giangiorgi & Blackstone, Ltd.

[57] ABSTRACT

A protector system is provided for use in a low voltage power feed arrangement including a device requiring a low voltage power feed, and a power source. The power source is capable of supplying the device with electrical power. The device is electrically connected to the power source by means of a power transmission line. A line protector set is electrically connected to the power transmission line between the device and the power source so that all power in the power transmission line must encounter the line protector before the power reaches the device. The line protector set comprises an over-voltage arrester and an over-current arrester. The over-voltage arrester is coupled in circuit for grounding the transmission line in the presence of an over-voltage condition. The over-current arrester comprises a positive temperature coefficient resistor electrically connected in series with the device for preventing over-currents on the transmission line from reaching the device.

7 Claims, 2 Drawing Sheets

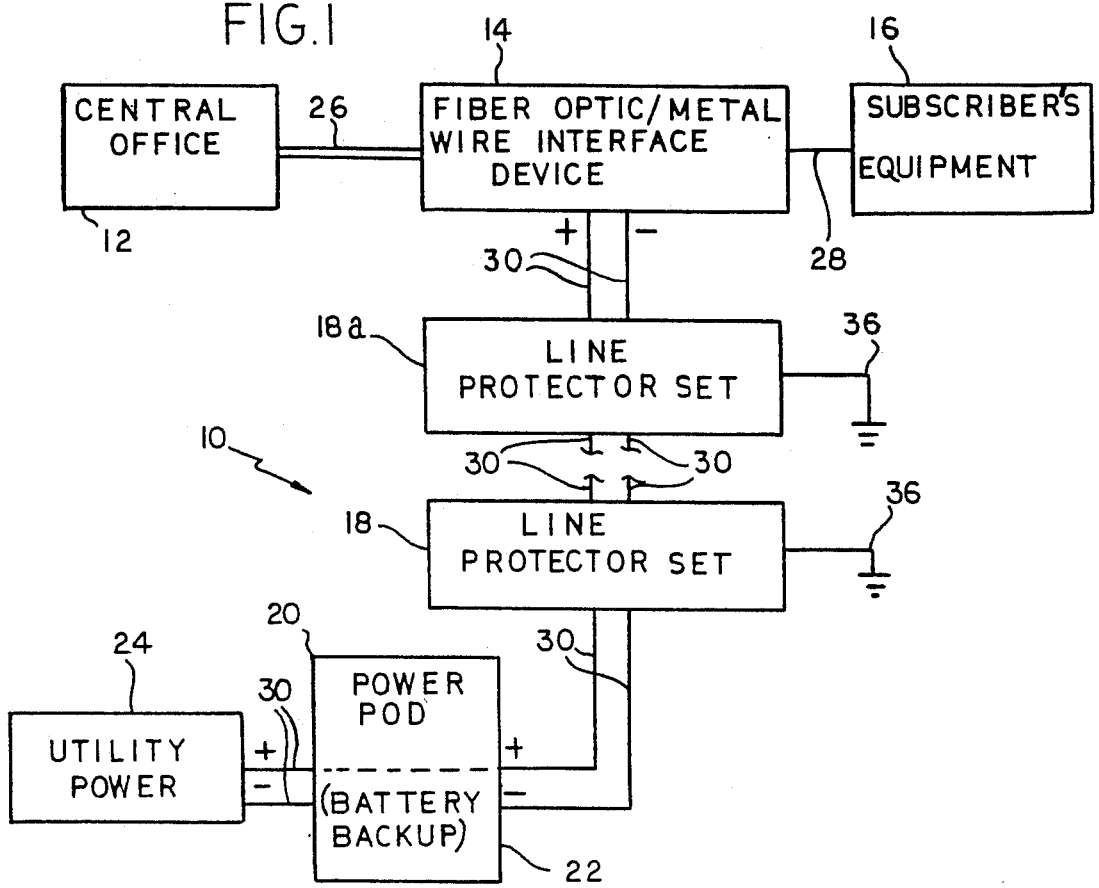
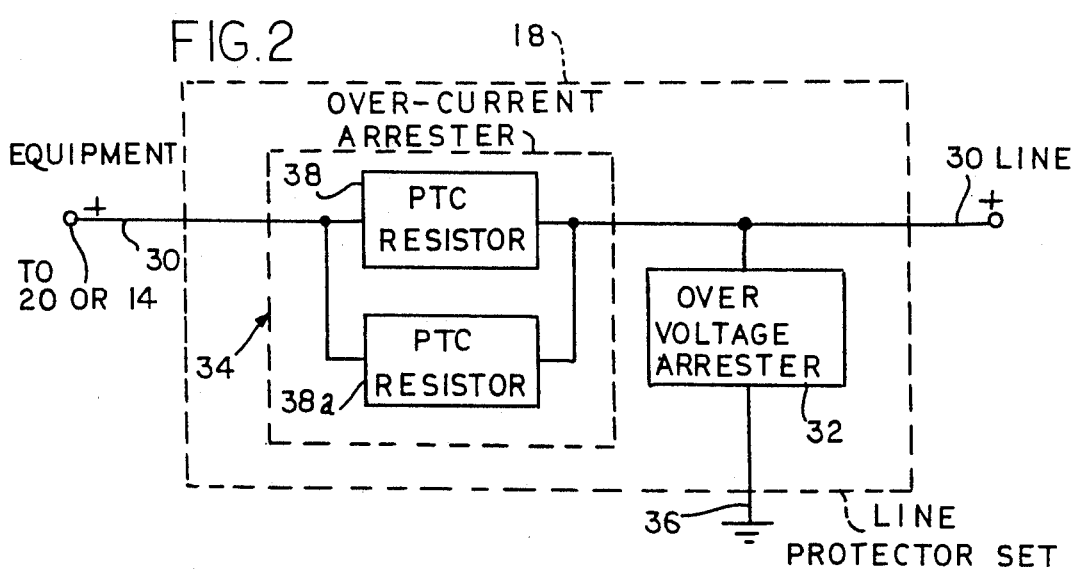

PROTECTOR SYSTEM FOR LOW VOLTAGE POWER FEED

BACKGROUND OF THE INVENTION

The present invention relates generally to a unique construction for an electric or electronic protector system for use with a low voltage and/or low current power feed. More specifically, the invention relates to a new construction of a protector system for use with a power supply feeding electric or electronic equipment used to interface optical fibers with older, electrically conductive wire cables in a telecommunications network.

Due to their superior transmission quality and faster transmission speeds, many owners of modern telecommunications networks have selected fiber optic telecommunications lines in new installations and also to replace the older, electrically conductive wire telecommunications transmission lines. To replace the older transmission lines, an optical fiber can be wrapped around the exterior of the existing lines. In either case, appropriate connection devices are used to link the optical fibers to other telecommunications equipment located in a central office, or in the field.

This type of replacement process works well with the transmission lines strung in the field from the central office, or other source of telecommunications signals, to a subscriber's premises. However, the subscriber's premises often possesses older, electrically conducting or metallic transmission wires extending from the termination of the transmission lines to the subscriber's equipment, such as telephones, computers, or facsimile machines.

Because the optical fibers operate in accordance with the phenomenon of total internal reflection of incident electromagnetic wave fronts, and not in accordance with the flow of electrons, the optical fibers cannot simply be spliced into connection with the electrically conducting wires in the subscriber's abode. Thus, an optical fiber/electrically conductive wire interface device must be used.

Generally, the interface device is connected at one end to the optical fibers, and at another end to the electrically conducting wires. The interface device embodies equipment which converts the optical signals carried by the optical fibers into a corresponding flow of electrons which is applied to the metallic wires. The corresponding electron flow then travels to the subscriber's equipment, where it is utilized accordingly. This conversion process can also be reversed.

Because the optical signals are very precise, the interface device must also have the same precision. The equipment embodied therein accordingly must be very sensitive. Due to the sensitivity of the equipment of the interface device, that equipment has very specific voltage and current tolerances, and uses relatively low currents and voltages. If a voltage or a current having a magnitude greater than the interface equipment's tolerances reaches the equipment, that equipment may be damaged. The protector system of the invention insures that such over-voltages and over-currents do not damage the interface device.

OBJECTS AND SUMMARY OF THE INVENTION

A general object of the present invention is to provide an over-current and over-voltage protector system for a low voltage power feed.

A related object of the invention is to provide a new and unique systems construction for use in optical fiber telecommunications networks.

Another object of the present invention is to provide a protector system employing a line protector set having both over-voltage and over-current protection means.

An additional object of the invention is to provide a system having a line protector having over-current protection means housed in a standard 5-pin protector housing configuration.

A further object of the present invention is to provide a system having a line protector having over-current protection means in the form of a positive temperature coefficient (hereinafter "PTC") resistor.

A protector system, constructed according to the teachings of the present invention, is provided for use with a device requiring a low voltage power feed, and a low voltage power source. The power source is capable of supplying the device with electrical power. The device is electrically connected to the power source by means of a power transmission line. A line protector set is electrically connected to the power transmission line between the device and the power source. The line protector comprises an over-voltage arrester and an over-current arrester. The over-voltage arrester is capable of grounding the line in response to an over-voltage condition. The over-current arrester comprises a positive temperature coefficient resistor electrically connected in series between the power source and the device so that it is capable of preventing over-currents from reaching the device.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals, identify like elements, and in which:

FIG. 1 is a block schematic diagram of a protector system, constructed according to the teachings of the present invention, for a low voltage power feed;

FIG. 2 is a block schematic diagram of the line protector illustrated in FIG. 1, showing unique features thereof;

DETAILED DESCRIPTION OF THE ILLUSTRATED EMBODIMENT

Figure 3:
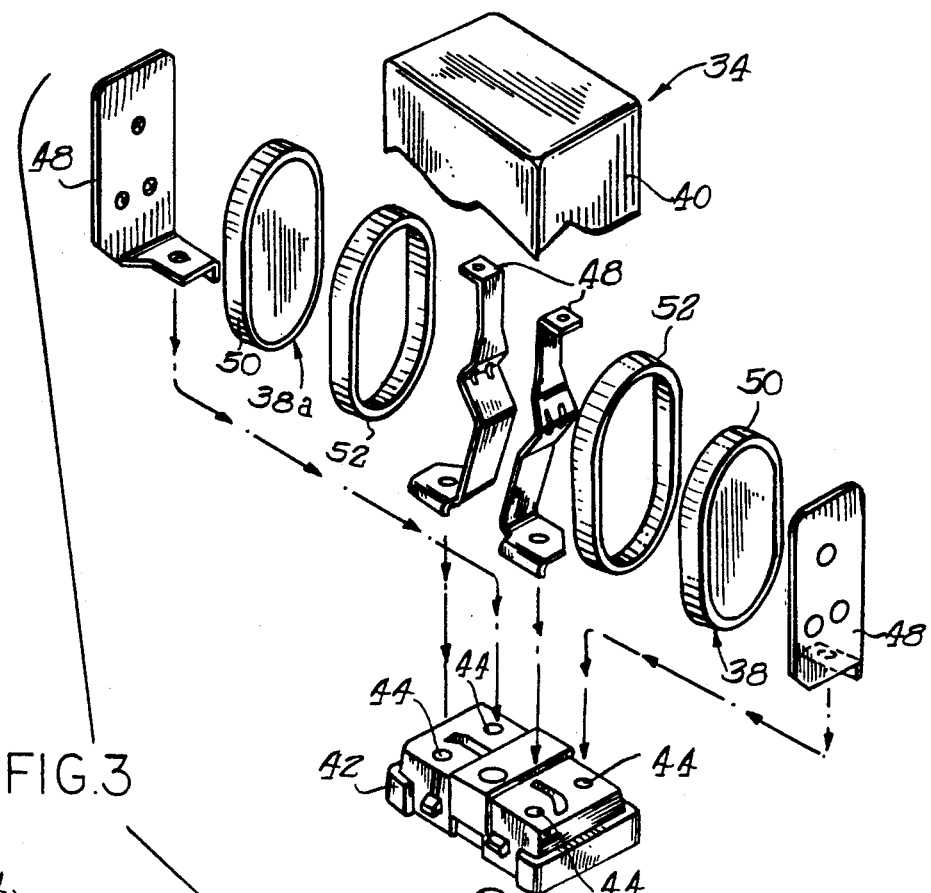
FIG. 3 is an exploded perspective view of the over-current arrester shown generally in FIG. 2.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1, a protector system 10, constructed according to the teachings of the present invention, for use with a low voltage power feed, is illustrated in block schematic form. While the protector system 10 is disclosed with respect to its employment with a telecommunications network, it is to be understood that the system 10 can be used in other applications.

The illustrated telecommunications network comprises a plurality of elements. Namely, the network comprises a central office or other source of signals 12, an optical fiber/electrically conductive wire interface device 14 requiring a low voltage power feed, subscriber's equipment 16, and a lower pod 20 including a battery back-up 22. Means for selecting one of utility power 24 and the battery back-up as a source of low voltage power for the interface device is provided within the power pod 20.

Connection is made between the central office 12 and the interface device 14 by means of optical fiber 26. The subscriber's equipment is connected by electrically conductive wires 28. The construction and composition of the fibers 26 and the wires 28 are well known in the art.

The central office 12 houses equipment, such as switches, and the like, useful for the operation, monitoring, and maintenance of a telecommunications network. The central office 12 receives telecommunications signals, processes them, and sends them out to an appropriate portion of the telecommunications network to a subscriber by mean of the optical fibers 26.

The optical fibers 26 accept the telecommunications signals from the central office 12, and carry those signals from the central office 12 towards the end user. The telecommunications signals are in optical electromagnetic wave form as they pass through by optical fibers 26. The electromagnetic waves comprising the telecommunications signals progress along the entire length of the optical fibers 26 due to the phenomenon of total internal reflection.

The optical fibers 26 cannot be connected directly to the subscriber's equipment 16. Instead, the optic fibers 26 are connected to the optical fiber/electrically conductive wire interface device 14. The interface device 14 is also connected to the subscriber's equipment 16 by means of metallic wires 28. The subscriber's equipment 16 can take on a plurality of embodiments, such as computers, telephones, facsimile machines, and the like.

The interface device 14 houses equipment for converting the optical signals carried by the optical fibers into corresponding electrical signals which can be transmitted by the metallic wires 28, and which can be used by the subscriber's equipment 16. Accordingly, the interface device 14 effectively "translates" the optical telecommunications signals into corresponding electrical telecommunications signals. Thus, the interface device 14 receives the optical telecommunications signals from the optical fibers 26, translates them, and sends corresponding signals along the wires 28 to the subscriber's equipment 16.

Because the wires 28 and the subscriber's equipment 16 cannot directly use the optical telecommunications signals carried by the optical fibers 26, the interface device 14 must operate continuously, as long as a subscriber is using the telecommunications network. This means that the interface device 14 must have a constant supply of electrical power. Also, due to the precision of the optical signals, the equipment housed within the interface device 14 has very specific voltage and current tolerances. In most cases, the interface equipment utilizes a low current, low voltage direct current power source. The protector system 10 of the invention helps to provide the interface device 14 with its exacting power requirements, by preventing potentially damaging over-current and/or over-voltage conditions from reaching the interface device 14. The protector system 10 also functions to protect equipment from lightening and AC power faults.

The interface device 14 is electrically connected to the power pod 20 by means of electrically conductive power transmission lines 30. The source of utility power 24 is usually an electricity generating station of common construction and functionality. Because the utility power 24 is often of the alternating current form, means must be provided for changing the alternating current generated by the utility power 24 into direct current so that it can be effectively utilized by the interface device 14. This means, among others, is provided by the power pod 20.

The power pod 20 is electrically located in series between the interface device 14 and the utility power 24. The transmission lines 30 electrically connect the power pod 20 to the utility power 24 at one side thereof, while similar lines 30 electrically connect the power pod 20 to the interface device 14 at another side thereof. In this way, the electrical power is supplied to the interface device 14 by the power pod 20.

The power pod 20 performs at least two functions. The power pod 20 has means, as discussed above, for changing the alternating current of the utility power 24 into direct current suitable for use by the interface device 14. This means also converts the utility power 24 to the appropriate voltage and current values dictated by the voltage and current requirements of the equipment comprising the interface device 14.

Because the interface device 14 must operate continuously in order for the telecommunications network to be utilized by a subscriber, the power pod 20 also contains an alternative power source which can be tapped if the utility power 24 is interrupted or cut off. The alternative power source usually comprises a battery back-up 22 incorporated into the power pod 20.

The battery back-up 22 may comprise a plurality of batteries which can supply the needed direct current to the interface device 14 when needed. In this way, it is assured that the interface device 14 will have a constant supply of electrical power so that the telecommunications network will continue to be functional, even if the utility power 24 is down.

The power pod 20 functions well to provide the interface device 14 with the appropriate power levels. However, in practice, the interface device 14 can be located some distance away from the power pod 20. Due to distance traversed by the transmission lines 30 from the power pod 20 to the interface device 14, among other causes, certain anomalies, such as over-voltages and over-currents can arise between the power pod 20 and the interface device 14.

Due to the sensitivity of the equipment of the interface device 14, these anomalies can wreak havoc with the interface device 14, thereby comprising the integrity of the telecommunications network, and resulting in inconvenience to the subscriber. Thus, the voltage and current anomaly levels are determined by the voltage and current tolerances of the equipment of the interface device 14.

To prevent these anomalies from adversely affecting the interface device 14, at least one line protector 18 is disposed electrically in series between the power pod 20 and the interface device 14. Preferably, two line protector sets 18 and 18a are employed; one located proximate to the power pod 20, and one located proximate to the interface device 14, as shown in FIG. 1.

Referring to FIG. 2, the general construction of one of the line protector sets 18 and 18a is illustrated in block schematic form. The line protector sets 18 and 18a comprise an over-voltage arrester 32 and a over-current arrester 34, both being connected electrically to the power transmission lines 30. It will be understood that one such protector set may be used in each of the respective positive and negative wires of the power transmission lines 30, however, only the protector set associated with the positive side of line 30 has been shown in FIG. 2 to simplify the illustration. It is anticipated that only an over-voltage protector such as protector 32 will normally be required at the end of the line 30 adjacent interface device 14; however, an over-current arrester 34 of the type shown in FIG. 2 may be used at this point also if desired without departing from the invention. Hence a line protector set 18a is shown adjacent interface device 14 also in FIG. 1.

The over-voltage arrester 32 is for removing the effects of over-voltages from the line 30, while the current arrester 34 is for removing the effects of over-currents. In this way, the interface device 14 is effectively protected from any anomalies in the power transmission lines 30.

The over-voltage arrester 32 can be of the gas tube-type, similar to that disclosed in the patent to Gilberts, U.S. Pat. No. 4,241,374, of the solid state-type, such as that disclosed in the patent to Kaczmarek, U.S. Pat. No. 4,958,253, or of any other suitable type. The above-referenced patents of Gilberts and Kaczmarek are assigned to the assignee of the present invention, and the disclosures of those patents are incorporated herein by this reference.

When the over-voltage arrester 32 encounters an over-voltage condition, it shunts the circuit, and discharges the over-voltage to ground 36, thereby dissipating it. Once the over-voltage is no longer present in the transmission line 30, the voltage arrester 32 returns to its original condition.

The over-current arrester 34 has a somewhat novel construction. Essentially, as shown in FIG. 2, the over-current arrester 34 comprises at least one positive temperature coefficient ("PTC") resistor 38 electrically connected in series to the line 30. One or more additional PTC resistors 38a may be used, depending upon the current levels encountered in operation, in parallel circuit with the PTC resistor 38.

Briefly, due to electrical resistance, an increase in temperature accompanies a corresponding increase in current. Thus, as current increases in the line 30, the temperature thereof as well as of the PTC resistors 38 and 38a also increases. As the temperature increases, the electrical resistance presented by the PTC resistors 38 and 38a increases, making it progressively more difficult for current to pass through the PTC resistors 38 and 38a.

When an over-current is present in the line 30, the resistance offered by the PTC resistors 38 and 38a increases to a value sufficient to effectively prohibit the flow of current therethrough completely. Thus, the circuit is effectively open, and no current flows, thereby preventing the over-current from reaching the interface device 14. The high resistance continues as long as an over-current is present. As the over-current dissipates, the temperature decreases, and the resistance also decreases, again allowing current to flow through the PTC resistors 38 and 38a.

The line protector sets 18 and 18a are employed differently from the protector devices used in telecommunications lines. The protectors in such lines are electrically connected in the signal path of a low-current telecommunications line. Thus, when an over-voltage condition is encountered, only a brief interruption in service results, while the device arcs to ground. However, the over-current features of these protectors are generally of a type which does not recover when used in a higher current DC power line. Many such over-current arrangements employed a solder pellet or other similar mechanism which would react to the higher current condition. The solder pellet would melt, thereby permanently shunting the telecommunications network. This shunting causes a service interruption which continues until the protector is replaced. This results in an extended network down time, which is unacceptable to many subscribers. The PCT resistor type arresters of the present invention operate as described above such that these service interruptions do not occur, thus allowing a telecommunications type protector to be used on a DC power line.

Moreover, the over-current arrester 34 is arranged in circuit ahead of over-voltage arrester 32, thus also protecting the latter from over-current conditions. That is, the over-current arrester 34 is preferably wired in series between the equipment (interface 14 or power pod 20) and the over-voltage arrester 32 (if in fact an over-current arrester 34 is used at the end of the line adjacent interface 14).

Figure 4:
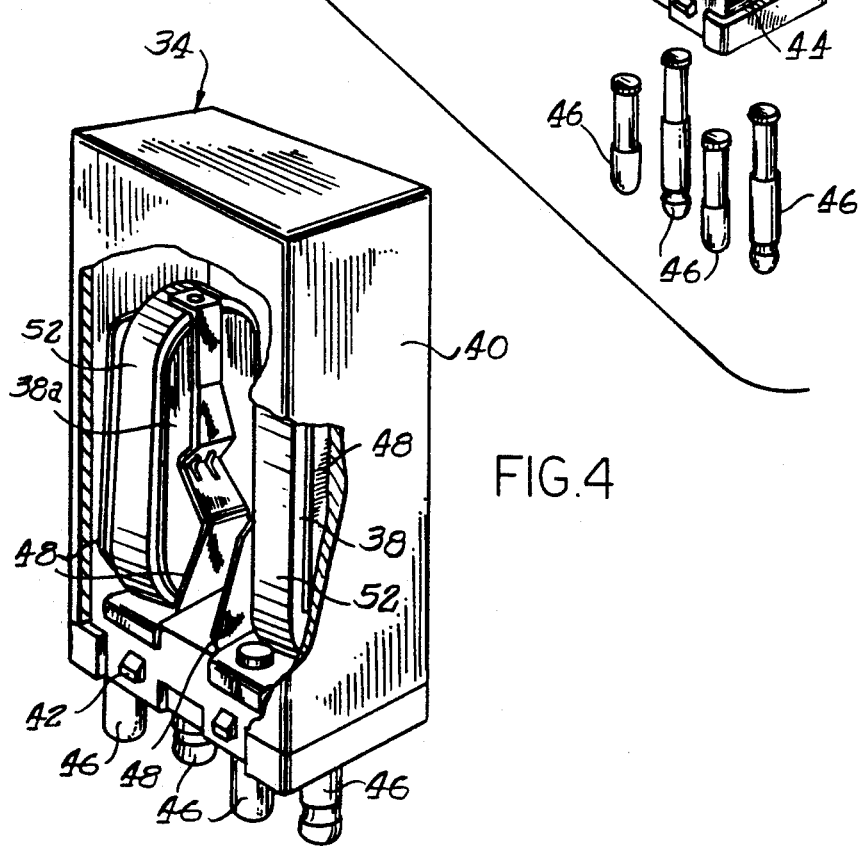
FIG. 4 is an assembled perspective view of the over-current arrester of FIG. 3 with a portion thereof broken away to reveal the internal configuration thereof.

FIG. 3 and FIG. 4 illustrate the preferred construction of the over-current arrester 34. The over-current arrester 34 is contained within an essentially box-like housing 40 having an open end. The open end is of sufficient size to accept the elements of the over-current arrester 34, and is closable by a base 42.

The base 42 has a plurality of through apertures 44 for accepting electrically conducting pins 46. Usually, the pins 46 are of a metallic, or other sufficiently conductive composition. The through apertures 44 are arranged in a configuration so that the pins 46 are insertable into a standard 5-pin socket, commonly found in telecommunications networks. Thus, the over-current arrester 34 can be simply plugged into the protector system 10. It is to be noted, however, that because the PTC resistors 38 and 38a are connected in series with the line to be protected, no ground connection is needed. Accordingly, only four pins 46 are needed.

The pins 46 project through the base 42, and are electrically connected to conducting elements 48. The conducting elements 48 are composed of a conducting material such as a metal. The conducting elements 48 are intended to bear current to and from two resistive elements 50. The resistive elements 50 are composed of a positive temperature coefficient material which performs as described above, and comprise the PTC resistors 38 and 38a. The exact composition of the PTC material depends upon the desired current levels. The resistive elements 50 are preferably ovally oblong in shape. This shape assists in preventing cracking of the elements 50 due to thermal stresses.

The housing 40 is relatively compact in order to save space, and to be easily insertable into the often-cramped conditions found in a telecommunications network, for example. Thus, in order to maintain the connections between the resistive elements 50 and conducting elements 48 and to prevent arcing of high voltages between the resistive elements 50 and the conducting elements 48, insulating spacers 52, composed of an insulating material such as rubber, are disposed within the housing 40.

The insulating spacers 52 are preferably band-like in construction, and are placed around the width periphery of each of the resistive elements 50. Thus, when completed, the construction of the over-current arrester 34 comprises, in a sandwich-like form, a conducting element 48, a resistive element 50 encompassed by an insulating spacer 52, two more conducting elements 48, another resistive element 50 encompassed by another spacer 52, and another conducting element 48, as shown in the broken away portion of FIG. 4.

The protector system 10, constructed according to the teachings of the present invention, is a new and useful way for protecting an interface device 14, or other electronic equipment having a low voltage power feed from the effects of over-voltages and over-currents on an associated power transmission line. The construction of the over-current arrester 34 allows for quick and easy installation and removal, thereby resulting in lower costs to the network operator. Additionally, the use of PTC resistors 38 and 38a connected in series in the line to be protected is a significant improvement over the over-current arrester constructions of the prior art.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A protector system for use in a low voltage power feed system including a device requiring low voltage electrical power and a power source for supplying the device with low voltage electrical power, the device being electrically connected to the power source by means of a power transmission line, and the protector system being electrically connected to the power transmission line between the device and the power source, said protector system comprising: a line protector set including an over-voltage arrester and an over-current arrester; the over-voltage arrester being electrically coupled in circuit for directing current to electrical ground in the presence of an over-voltage condition on the power transmission line; the over-current arrester comprising at least one positive temperature coefficient resistor electrically connected in series in the power transmission line between the power source and the device for preventing over-currents form reaching the device; wherein the device is an optical fiber/electrically conductive wire interface device.

2. A protector system as defined in claim 1 wherein the over-current arrester is contained within a housing having a base including conducting pins arranged in a configured for insertion into a standard 5-pin socket, for facilitating connection in the power transmission line.

3. A protector system as defined in claim 1 wherein said over-current arrester includes at least two positive temperature coefficient resistors electrically connected in parallel with each other and in series with the power transmission line.

4. A protector system for use in a low voltage power feed system including a device requiring low voltage electrical power, and a power source for supplying the device with low voltage electrical power, the device being electrically connected to the power source by means of a power transmission line, and the protector system being electrically connected to the power transmission line between the device and the power source, said protector system comprising: a line protector set including an over-voltage arrester and an over-current arrester; the over-voltage arrester being electrically coupled in circuit for directing current to electrical ground in the presence of an over-voltage condition on the power transmission line; the over-current arrester comprising at least one positive temperature coefficient resistor electrically connected in series in the power transmission line between the power source and the device for preventing over-currents from reaching the device;

wherein a second line protector set is electrically connected between the power source and the device, and wherein one line protector set is connected in proximity to the power source, and one line protector set is connected in proximity to the device.

5. A telecommunications network comprising: a source of telecommunications signals; an optical fiber-/electrically conductive wire interface device requiring a low voltage power feed; the source of signals being connected to the interface device by an optical fiber; subscriber's equipment connected to the interface device by an electrically conducting wire; a low voltage power source electrically connected to the interface device by means of a power transmission line; a line protector set electrically connected to the power transmission line between the interface device and the power source; the line protector set comprising an over-voltage arrester electrically coupled between the power transmission line and electrical ground, and an over-current arrester electrically coupled in series in the power transmission line between the power source and the interface device; and the over-current arrester comprising at least one positive temperature coefficient resistor.

6. A telecommunications network as defined in claim 5 further comprising a power pod electrically connected between the power source and the interface device, the power pod having a battery back-up and being capable of selecting one of the power source and the battery back-up as a source of low voltage power for the interface device.

7. A telecommunication network as defined in claim 5 wherein a second line protector set is electrically connected between the power source and the device, and wherein one line protector set is connected in proximity to the power source and one line protector set is connected in proximity to the device.

* * * * *

UNITED STATES PATENT AND TRADEMARK OFFICE
CERTIFICATE OF CORRECTION

PATENT NO. : 5,237,483
DATED : August 17, 1993
INVENTOR(S) : Allen D. Gara

It is certified that error appears in the above-indentified patent and that said Letters Patent is hereby corrected as shown below:

Column 3, Line 16 " lower" should be -- power --
Column 7, Line 68 " form " should be -- from --

Signed and Sealed this

Nineteenth Day of April, 1994

Attest:

BRUCE LEHMAN

*Attesting Officer*     *Commissioner of Patents and Trademarks*